Nov. 18, 1924. 1,516,447
J. C. M. MACLAGAN
CYLINDER END OR COVER FOR INTERNAL COMBUSTION ENGINES
Filed March 28, 1923

INVENTOR
JOHN C.M. MACLAGAN
BY
ATTORNEYS

Patented Nov. 18, 1924.

1,516,447

UNITED STATES PATENT OFFICE.

JOHN CAMPBELL MACCALL MACLAGAN, OF DRUMCHAPEL, SCOTLAND, ASSIGNOR TO NORTH BRITISH DIESEL ENGINE WORKS, (1922) LIMITED, OF GLASGOW, SCOTLAND.

CYLINDER END OR COVER FOR INTERNAL-COMBUSTION ENGINES.

Application filed March 28, 1923. Serial No. 628,231.

*To all whom it may concern:*

Be it known that I, JOHN CAMPBELL MACCALL MACLAGAN, a subject of the King of Great Britain and Ireland, and a resident of Drumchapel, Scotland, have invented certain new and useful Cylinder Ends or Covers for Internal-Combustion Engines, of which the following is the specification.

The invention relates to cylinder ends or covers for internal combustion engines, particularly applicable to the two-stroke cycle engine described in the earlier patent specification No. 1,436,596 and has for its object to improve the construction of such covers.

In the engine described in the earlier patent specification hereinbefore referred to, a moving cylinder is guided at its end or ends (depending upon whether it is single or double acting) on a combustion head or heads supported from the engine framing. As hitherto constructed, this combustion head (or heads) has two openings through it, one to receive the fuel injection valve and another through which the starting air is transmitted.

According to the present invention, only one valve aperture is provided through the apex of the conical combustion space in the combustion head. This aperture receives the inner end of the fuel injection valve casing. The valve controlling the supply of starting air is held in a passage in the cover and the end of the fuel injection valve casing is flattened or grooved. An opening leading from the passage holding the starting valve communicates with these grooves. There is thus only one aperture through the walls of the combustion space for the admission of both the oil fuel and the starting air.

The starting valve case may also contain a relief valve and indicator or drain connection.

Figure 1:
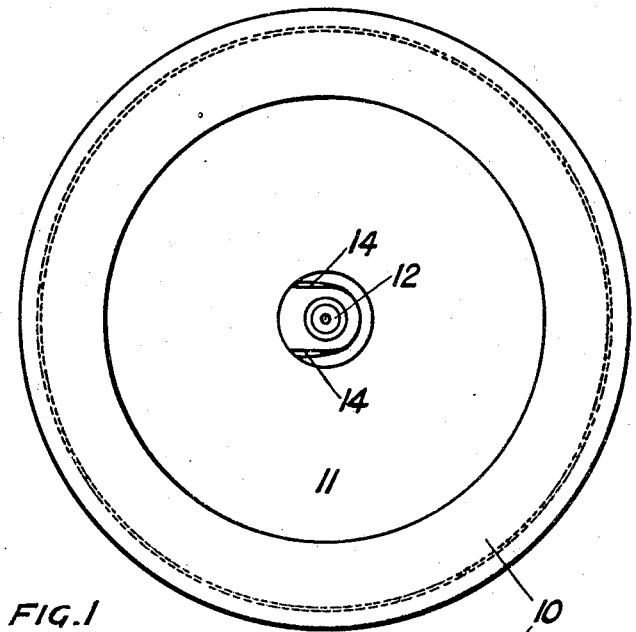
Figure 2:
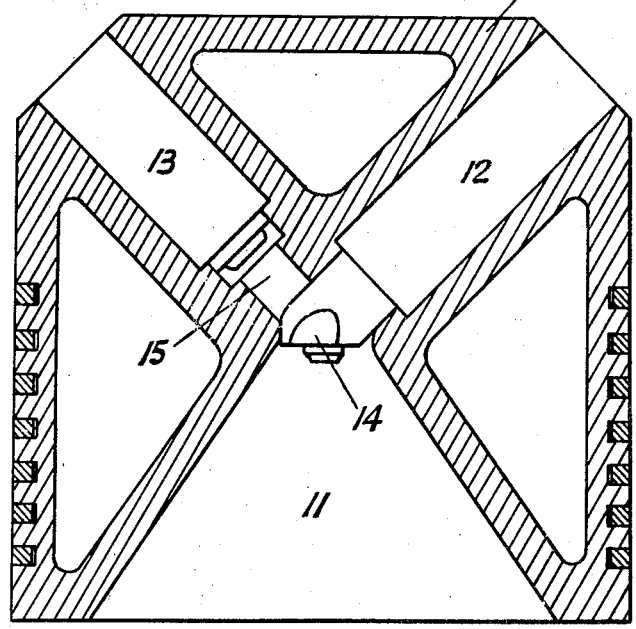

Figure 1 on the accompanying sheet of explanatory drawings is an inverted plan view and Figure 2 is a sectional elevation of the improved end or cover which also forms the combustion head for the engine cylinder.

As shown in the drawings, the combustion head 10 is constructed with the usual conical combustion space 11 in the apex of which there is provided an aperture to receive the inner end of a fuel injection valve casing 12. A valve 13 controlling the supply of starting air is held in a passage in the combustion head cover 10 and the sides 14 of the inner end of the fuel injection valve casing 12 are flattened or grooved. An opening 15 leading from the passage holding the starting valve 13 communicates with these grooved parts 14. There is thus only one aperture through the apex of the combustion space 11 for the admission of both the oil fuel and the starting air.

What I claim is:—

1. In an internal combustion engine, a combustion head having a central aperture in the wall thereof, an air injection passage in the combustion head leading into the said central aperture, a fuel injection passage in the combustion head leading into the said central aperture, and a valve casing in the fuel injection passage having its end projecting into the central aperture, the said end being so shaped as to permit communication between the air injection passage and the said central aperture.

2. In an internal combustion engine, a combustion head having a central aperture in the wall thereof, an air injection passage in the combustion head leading into the said central aperture, a fuel injection passage in the combustion head leading into the said central aperture, and a valve casing in the fuel injection passage having its end projecting into the central aperture, the said end having flattened sides to permit communication between the air injection passage and the central aperture.

In testimony whereof I have signed my name to this specification.

JOHN CAMPBELL MACCALL MACLAGAN.